(12) United States Patent
Zhang et al.

(10) Patent No.: US 11,313,489 B2
(45) Date of Patent: Apr. 26, 2022

(54) MICROFLUIDIC DEVICE FOR CONTROLLING PNEUMATIC MICROVALVES

(71) Applicant: IMEC VZW, Leuven (BE)

(72) Inventors: Lei Zhang, Kessel-lo (BE); Tim Stakenborg, Heverlee (BE); Chengxun Liu, Heverlee (BE); David Cheyns, Heffen (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 17/135,192

(22) Filed: Dec. 28, 2020

(65) Prior Publication Data
US 2021/0199211 A1    Jul. 1, 2021

(30) Foreign Application Priority Data

Dec. 30, 2019   (EP) .................................... 19220147
Feb. 28, 2020   (EP) .................................... 20159985

(51) Int. Cl.
*F16K 31/128*    (2006.01)
*F16K 7/10*      (2006.01)
(Continued)

(52) U.S. Cl.
CPC ............. *F16K 31/128* (2013.01); *F16K 7/10* (2013.01); *F16K 7/123* (2013.01); *F16K 11/24* (2013.01); *F16K 31/004* (2013.01)

(58) Field of Classification Search
CPC ...... F16K 31/004; F16K 31/128; F16K 17/10; F16K 7/123; F16K 11/24; F16K 99/0015; F16K 2099/008
See application file for complete search history.

(56) References Cited

U.S. PATENT DOCUMENTS 6,056,269 A * 5/2000 Johnson .................... F15C 5/00
                                                    251/331
6,126,140 A * 10/2000 Johnson ................... F15C 5/00
                                                    251/129.01
(Continued)

FOREIGN PATENT DOCUMENTS

WO         03068670 A2     8/2003

OTHER PUBLICATIONS

Unger, Marc A., Hou-Pu Chou, Todd Thorsen, Axel Scherer, and Stephen R. Quake "Monolithic microfabricated valves and pumps by multilayer soft lithography." Science 288, No. 5463 (2000): 113-116.

(Continued)

*Primary Examiner* — William M McCalister
(74) *Attorney, Agent, or Firm* — McDonnell Boehnen Hulbert & Berghoff LLP (57) ABSTRACT

Example embodiments relate to microfluidic devices for controlling pneumatic microvalves. One embodiment includes a microfluidic device for independently controlling a plurality of pneumatic microvalves. The microfluidic device is couplable to a pressure source. The microfluidic device includes a first substrate. The microfluidic device also includes a flexible membrane covering the first substrate. Additionally, the microfluidic device includes a second substrate covering the flexible membrane. Further, the microfluidic device includes one or more fluidic channels at least partially defined in the first substrate. In addition, the microfluidic device includes a pressure couplable to the pressure source and branching into a plurality of pressure channels. Still further, the microfluidic device includes at least one pressure control switch per pressure channel.

19 Claims, 2 Drawing Sheets

(51) Int. Cl.
*F16K 7/12* (2006.01)
*F16K 31/00* (2006.01)
*F16K 11/24* (2006.01)

(56) References Cited

U.S. PATENT DOCUMENTS

| | | | | |
|---|---|---|---|---|
| 6,158,712 | A * | 12/2000 | Craig | B01L 3/502707 251/331 |
| 6,240,962 | B1 * | 6/2001 | Tai | F15C 5/00 137/859 |
| 6,418,968 | B1 * | 7/2002 | Pezzuto | B01L 3/502738 137/833 |
| 6,444,173 | B1 * | 9/2002 | Sjursen | B01L 3/0268 204/600 |
| 6,527,003 | B1 * | 3/2003 | Webster | F15C 5/00 137/15.18 |
| 6,752,966 | B1 * | 6/2004 | Chazan | B01L 3/502707 422/500 |
| 6,896,238 | B2 * | 5/2005 | Wang | F15C 5/00 251/331 |
| 9,121,058 | B2 * | 9/2015 | Stern | B01J 19/0046 |
| 9,416,883 | B2 * | 8/2016 | Van Den Bijgaart | F15C 5/00 |
| 9,663,819 | B2 * | 5/2017 | Jovanovich | G01N 27/44721 |
| 2002/0117517 | A1 * | 8/2002 | Unger | F16K 99/0017 222/214 |
| 2004/0022676 | A1 * | 2/2004 | Hamilton | C02F 1/76 422/37 |
| 2006/0073484 | A1 | 4/2006 | Mathies et al. | |
| 2009/0325276 | A1 * | 12/2009 | Battrell | B01F 11/0071 435/287.2 |
| 2011/0041935 | A1 * | 2/2011 | Zhou | F15C 1/08 137/565.01 |
| 2012/0181460 | A1 * | 7/2012 | Eberhart | F16K 99/0015 251/61.1 |
| 2013/0048092 | A1 | 2/2013 | Addae-Mensah et al. | |
| 2013/0139895 | A1 * | 6/2013 | Vangbo | F04B 43/043 137/2 |
| 2013/0313452 | A1 * | 11/2013 | Tice | F16K 99/0051 251/129.01 |
| 2014/0322489 | A1 * | 10/2014 | Unger | F16K 99/0046 428/156 |
| 2016/0096176 | A1 * | 4/2016 | Jarvius | C23C 16/22 435/289.1 |
| 2016/0367981 | A1 * | 12/2016 | Wunderle | F16K 99/0015 |

OTHER PUBLICATIONS

Extended European Search Report and Written Opinion, EP Application No. 20159985.9, dated Sep. 11, 2020, 4 pages.

* cited by examiner

MICROFLUIDIC DEVICE FOR CONTROLLING PNEUMATIC MICROVALVES

CROSS-REFERENCE TO RELATED APPLICATIONS

The present application is a non-provisional patent application claiming priority to European Patent Application No. EP 20159985.9, filed Feb. 28, 2020, and Provisional European Patent Application No. EP 19220147.3, filed Dec. 30, 2019, the contents of each of which are hereby incorporated by reference.

FIELD OF THE DISCLOSURE

The present disclosure relates to microfluidic devices comprising pneumatic microvalves and in particular to such devices adapted for controlling the pneumatic microvalves independently.

BACKGROUND

After the first introduction by Unger et al. (UNGER, Marc A., et al. Monolithic microfabricated valves and pumps by multilayer soft lithography. *Science,* 2000, 288.5463: 113-116.), integrated pneumatic microvalves made by soft lithography—and pumps based on such valves—have often been used in microfluidic devices to control fluid flows. However, in these applications, each pneumatic microvalve is typically connected to an external pressure control switch for switching on/off the pressure in a control channel. This becomes increasingly problematic as the amount of valves which are integrated within a single microfluidic device increases, leading to a rapid increase in size for the microfluidic device as such—since an increasing number of pressure lines and inlets for connecting to the external pressure control switches is provided—and of the infrastructure supporting the microfluidic device—since the number of external pressure control switches and even pressure sources increases.

US20130313452A1 discloses a system which partially addresses the above problem by integrating also the pressure control switch into the microfluidic device, thereby removing some of the bulk of the supporting infrastructure. However, US20130313452A1 relates only to a single pneumatic valve and is not concerned with integrating a plurality of such valves into a single microfluidic device. As such, it does not provide for independent control of a plurality of pneumatic microvalves based on a single pressure line and inlet.

Moreover, the above described microfluidic devices are based on soft lithography and elastomeric materials (e.g., polydimethylsiloxane, PDMS), which may allow for the design of relatively straightforward microfluidic devices and pneumatic microvalves (e.g., in terms of rapid prototyping, ease of fabrication, and forgiving process parameters). However, these materials and methods come with intrinsic problems when the aim is to make more complicated devices (e.g., when integrating a plurality of pneumatic microvalves with (electrical) connections and circuits that allow them to be controlled independently) for real-world use and on an industrial scale. For example, the elastomeric materials typically show limited surface stability over time, do not easily allow to form (electrical) connections and circuits therein, and the adhesion of other materials thereto is often problematic.

There is thus still a need in the art for microfluidic devices and systems which address at least some of the issues outlined above.

SUMMARY

The present disclosure provides microfluidic devices for independently controlling a plurality of pneumatic microvalves therein. The present disclosure further provides systems and uses associated therewith.

In some embodiments, different pneumatic microvalves can be controlled independently (e.g., individually).

In some embodiments, pressure to a plurality of pneumatic microvalves can be supplied by a single pressure line. Further, in some embodiments, the amount of pressure inlets—and optionally outlets—can be reduced.

In some embodiments, the pneumatic microvalves and pressure control switches can be effectively sealed upon closing them.

In some embodiments, the pneumatic microvalves and pressure control switches can be controlled with minimal force (e.g., pressure or actuation force).

Some embodiments may be readily fabricated, using materials and techniques which are compatible with mature manufacturing platforms such as CMOS processing and larger-area electronics. Additionally, in some embodiments, soft lithography and elastomeric materials can be avoided. Further, in some embodiments, the pneumatic microvalves can be integrated with (complex) electronic circuits on a single device.

In a first aspect, the present disclosure relates to a microfluidic device for independently controlling a plurality of pneumatic microvalves, the microfluidic device being couplable to a pressure source and comprising: (i) a first substrate; (ii) a flexible membrane covering the first substrate; (iii) a second substrate covering the flexible membrane; (iv) one or more fluidic channels at least partially defined in the first substrate; (v) a pressure line couplable to the pressure source and branching into a plurality of pressure channels, the pressure channels being at least partially defined in the second substrate; (vi) the plurality of pneumatic microvalves, each comprising a portion of one of the fluidic channels, and a first portion of the pressure channel overlapping the fluidic channel portion, the first pressure channel portion and the fluidic channel portion being separated by the flexible membrane, such that a pressure in the first pressure channel portion can bend the flexible membrane into the fluidic channel portion and/or out of the first pressure channel portion, thereby closing the fluidic channel portion, or out of the fluidic channel portion and/or into the first pressure channel portion, thereby opening the fluidic channel portion; and (vii) at least one pressure control switch per pressure channel, each comprising a cavity in the first substrate, a second portion of the corresponding pressure channel overlapping the cavity, the second pressure channel portion and the cavity being separated by the flexible membrane, and an actuator for bending the flexible membrane into the second pressure channel portion and/or out of the cavity, thereby closing the second pressure channel portion, or out of the second pressure channel portion and/or into of the cavity, thereby opening the second pressure channel portion; wherein each actuator can be operated independently.

In a second aspect, the present disclosure relates to a system comprising the microfluidic device as defined in any embodiment of the first aspect coupled to a pressure source.

In a third aspect, the present disclosure relates to a use of a microfluidic device according to any embodiment of the first aspect, for independently controlling a plurality of pneumatic microvalves.

Particular aspects are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are represent substantial improvements, including departures from prior practices, resulting in the provision of more efficient, stable and reliable devices of this nature.

The above and other characteristics and features will become apparent from the following detailed description, taken in conjunction with the accompanying drawings, which illustrate, by way of example, the principles of the disclosure. This description is given for the sake of example only, without limiting the scope of the disclosure. The reference figures quoted below refer to the attached drawings.

In the different figures, the same reference signs refer to the same or analogous elements.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable with their antonyms under appropriate circumstances and that the embodiments described herein are capable of operation in other orientations than described or illustrated herein.

It is to be noticed that the term "comprising", used in the claims, should not be interpreted as being restricted to the features listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising A and B" should not be interpreted as being limited to devices consisting only of components A and B. It means that with respect to the present disclosure, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of example embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, understood methods, structures, and techniques have not been shown in detail in order not to obscure an understanding of this description.

The following terms are provided solely to aid in understanding.

As used herein, and unless otherwise specified, a "flexible" entity (e.g., material) is an entity having a Young's modulus 100 MPa or less (e.g., 10 MPa or less, 5 MPa or less, 2 MPa or less, or 1 MPa or less). The flexible entity may, for example, have a Young's modulus of from 50 kPa to 3 MPa (e.g., from 100 kPa to 1 MPa or from 200 kPa to 750 kPa).

As used herein, and unless otherwise specified, a "rigid" entity (e.g., material) is an entity having a Young's modulus of 1 GPa or more (e.g., 10 GPa or more, 25 GPa or more, 75 GPa or more, or 100 GPa or more). The rigid entity may, for example, have a Young's modulus of from 20 GPa to 2000 GPa (e.g., from 50 to 1000 GPa or from 100 GPa to 500 GPa).

As used herein, and unless otherwise specified, the expression "for at least one 'entity'" (e.g., "for at least one pressure control switch") used in combination with certain features when describing an embodiment means that the microfluidic device comprises—or may comprise—a plurality of the entities and that the described features hold for at least one of these entities. In some embodiments, the features may hold for multiple of the entities (e.g., for each of them). When reference is made in to "an entity" or "the entity" without further specification, but where the microfluidic device comprises multiple such entities, the expression "for at least one entity" is implicit.

As used herein, and unless otherwise specified, when two layers are said to be in contact—or when one layer is said to be on another layer—, it is meant that the two layers are in direct physical contact with each other.

In a first aspect, the present disclosure relates to a microfluidic device for independently controlling a plurality of pneumatic microvalves, the microfluidic device being couplable to a pressure source and comprising: (i) a first substrate; (ii) a flexible membrane covering the first substrate; (iii) a second substrate covering the flexible membrane; (iv) one or more fluidic channels at least partially defined in the first substrate; (v) a pressure line couplable to the pressure source and branching into a plurality of pressure channels, the pressure channels being at least partially defined in the second substrate; (vi) the plurality of pneumatic microvalves, each comprising a portion of one of the fluidic channels, and a first portion of the pressure channel overlapping the fluidic channel portion, the first pressure channel portion and the fluidic channel portion being separated by the flexible membrane, such that a pressure in the first pressure channel portion can bend the flexible membrane into the fluidic channel portion and/or out of the first pressure channel portion, thereby closing the fluidic channel portion, or out of the fluidic channel portion and/or into the first pressure channel portion, thereby opening the fluidic channel portion; and (vii) at least one pressure control switch per pressure channel, each comprising a cavity in the first substrate, a second portion of the corresponding pressure channel overlapping the cavity, the second pressure channel portion and the cavity being separated by the flexible membrane, and an actuator for bending the flexible membrane into the second pressure channel portion and/or out of the cavity, thereby closing the second pressure channel portion, or out of the second pressure channel portion and/or into of the cavity, thereby opening the second pressure channel portion; wherein each actuator can be operated independently.

As mentioned in the background section, local control of a single pneumatic valve has been previously disclosed, but the problem of integrating several (e.g., 5 or more or 10 or more) such pneumatic valves has not been addressed. Particular problems which were left outstanding are for example the growing number of pressure inlets and pressure channels as more pneumatic valves are added, as well as how to provide increasingly complex electronic controls used to operate a growing number of pressure control switches. The first problem is presently addressed by using a pressure line with a single inlet which then branches into a plurality of pressure channels within the microfluidic device, thereby supply the pressure to a plurality of the pneumatic microvalves using a single inlet and reduced total length of pressure channels. The second problem is addressed by stepping away from microfluidic devices chiefly based on soft lithography and elastomeric materials, towards a more flexible platform in which typically only a single elastomeric flexible membrane is to be used, whereas the materials of the two substrates between which it is sandwiched can be chosen more freely. For example, rigid materials such as Si and/or glass can be used, optionally combined with polymers, which are more durable, easier to work with in a manufacturing environment and for which well-matured processing techniques are used, such as CMOS processing and large-area electronics. Based on these matured processing techniques, not only can channels and cavities be defined in a precisely controlled manner, but also complicated electronic circuits can be formed on or in the substrates prior to assembling the microfluidic device. These electronic circuits can be for independently controlling the plurality of pressure control switches, but can also be related to other techniques (e.g., analysis) to be performed on the fluid in the fluid channel. After processing the substrates, the present microfluidic device can be assembled in a straightforward manner. For example, one can simply bind the flexible membrane onto the processed first substrate, form actuator elements on or in the flexible membrane and then bind the processed second substrate (optionally comprising further actuator elements) onto the flexible membrane.

The microfluidic device may typically be any microfluidic device in which a plurality of pneumatic microvalves are to be independently (e.g., individually) controlled. In embodiments, the microfluidic device may be a chip. In embodiments, the microfluidic device may be used as such or may be coupled to one or more further devices. In some embodiments, such a further device could also be considered to be an auxiliary structure (cf. infra) of the microfluidic device as such. In embodiments, the microfluidic device—as such or coupled to the one or more further devices—may be for a lab-on-a-chip or point-of-care application.

In embodiments, the first substrate may be made up of a single layer or may comprise multiple layers (e.g., two layers). In embodiments, the second substrate may be made up of a single layer or may comprise multiple layers (e.g., two layers). Regardless of how many layers the first substrate and the second substrate are made up of, the layer of each which contacts the flexible membrane typically comprises (e.g., consists of) a different material than the flexible membrane.

In some embodiments, the first substrate and/or the second substrate may comprise a rigid material. In embodiments, the rigid material may be a semiconductor-based material or a metal-based material. In embodiments, the semiconductor-based material may be a semiconductor material as such (e.g., Si or Ge) or a compound comprising the semiconductor (e.g., an oxide, nitride, or alloy thereof, such as $SiO_2$, SiN, or SiGe). In embodiments, the metal-based material may be a semiconductor as such or a compound comprising the metal (e.g., an oxide, nitride or alloy thereof). In some embodiments, the rigid material may be glass or Si. In embodiments, the first and/or second substrate may comprise at least one rigid layer (e.g., a layer consisting of a rigid material). In some embodiments, the first and/or second substrate may be rigid. For example, the first substrate may comprise a rigid first layer and a second layer (which may or may not be rigid) over the first layer and in contact with flexible membrane, configured such that the first substrate taken as a whole is rigid. Likewise, the second substrate may comprise a first layer (which may or may not be rigid) in contact with flexible membrane and a rigid second layer over the first layer, configured such that the second substrate taken as a whole is rigid. In embodiments, layers of the first and/or second substrate which are not made of rigid material may comprise a carbon-based material, such as a polymer. In embodiments, the polymer may differ from the material of the flexible membrane. For example, the first substrate be made of a single layer of glass, or may comprise a first layer of glass and second layer made—on the first layer and in contact with the flexible membrane—of polymer. Similarly, the second substrate may be made of a single layer of Si or polymer, or may comprise a first layer—on the flexible membrane—of Si or polymer and a second layer—on the first layer—of glass, Si or polymer.

In embodiments, the flexible membrane may comprise (e.g., consist of) an elastomeric material, such as polydimethylsiloxane (PDMS). In embodiments, the flexible membrane may have a thickness of from 0.1 to 100 µm (e.g., from 0.5 µm to 50 µm or from 1 µm to 25 µm). The flexible membrane is sandwiched between the first substrate and the second substrate, but is configured such that—thanks to the overlapping first pressure channel portion and fluidic channel portion—it can locally bend to close the fluidic channel portion and—thanks to the overlapping second pressure channel portion and cavity—it can locally bend to close the first pressure channel portion.

In embodiments, the one or more fluidic channels may comprise a fluidic inlet and a fluidic outlet. Each fluidic channel may have its own inlet and/or outlet, or multiple fluidic channels may share an inlet and/or outlet. The fluidic channel typically comprises a fluid that is to be pumped or otherwise routed. The fluid may for example be a fluid that is to be analysed. The fluidic channel may be defined in the first and the second substrate (i.e., its path may cross from the one substrate to the other, such as through an opening in the flexible membrane), but at least the fluidic channel portion is defined in the first substrate. In embodiments, a profile of the fluidic channel portion may be complementary to a profile of the flexible membrane when the flexible membrane is bent into the fluidic channel portion.

In embodiments, a profile of the fluidic channel portion (e.g., perpendicular to the flow direction) may be complementary to a profile of the flexible membrane when the flexible membrane is bent into the fluidic channel portion. In embodiments, a height of the fluidic channel portion may taper towards an edge thereof. In embodiments, the complementary profile of the fluidic channel portion may be substantially trapezoidal (e.g., isoscelic), with tapering sides (i.e., not rectangular or square), or hemispherical. A complementary profile may allow to more tightly and, thus, more completely close off the second pressure channel portion. In embodiments, fluidic channel portion may be wider than another portion of the fluidic channel. In embodiments, the profile of the fluidic channel portion may be complementary to the profile of the flexible membrane both perpendicular and parallel to the flow direction. This may further improve the sealing of the fluidic channel portion.

In embodiments, the microfluidic device may comprise one or more pneumatic microvalves per pressure channel. In embodiments, at least one pressure channel may comprise a plurality of subchannels. In embodiments, a pressure in the plurality of subchannels may be controlled in unison. For example, the at least one pressure control switch per pressure channel may simultaneously control the plurality of subchannels.

In embodiments, a distance (measured along the pressure channel) between the pressure control switch and the pneumatic microvalve may be less than 1 mm (e.g., less than 500 µm, less than 200 µm, less than 100 µm, from 1 µm to 100 µm, or from 5 µm to 50 µm). A limited distance between the pressure control switch and the pneumatic microvalve may minimize the pressure drop in between both, thereby allowing the pressure control switch to more effectively control the pressure at the pneumatic valve.

In embodiments, the pressure line may comprise a pressure inlet for coupling to the pressure source. The pressure line may typically deliver a pressure (e.g., to the pneumatic microvalves) by flowing a gas (e.g., air) or another fluid (e.g., a liquid such as water or a liquid dielectric) through the pressure line and pressure channels. In some embodiments, the microfluidic device may comprise a pressure outlet (e.g., for releasing the pressure back out). The microfluidic device may comprise an outlet for each pressure channel separately or multiple pressure channels may share a single outlet (e.g., the pressure channels may merge back into a pressure line with a single outlet). In embodiments where the pressure switch is upstream from the pneumatic valve, a distance (measured along the pressure channel) between the pressure control switch and the pressure outlet may be 1 mm or more (e.g., 2 mm or more or 5 mm or more). By making the pressure channels—and more particularly the portions thereof after the pressure control switches—sufficiently long, a slow pressure drop may be realized, so that the pressure supplied through the pressure line can be utilized in an optimized fashion. In such a situation, the pneumatic valve may for example close fast and open slowly. In embodiments where the pressure switch is downstream from the pneumatic valve, a distance (measured along the pressure channel) between the pressure control switch and the pressure outlet may be less than 1 mm (e.g., 0.1 mm or less or 0.01 mm or less). In such a situation, the pneumatic valve may for example close slowly and open fast.

In embodiments, at least one actuator may be selected from an electrostatic actuator, a piezoelectric actuator or a thermal actuator. In embodiments, each actuator may be independently selected from an electrostatic actuator, a piezoelectric actuator or a thermal actuator. In embodiments, each actuator may be coupled to an electrical connection for controlling the actuator (e.g., controlling the activation thereof). In embodiments, the actuator may comprise at least a first actuator element (e.g., in contact with the flexible membrane) and optionally a second actuator element (e.g., in contact with the second substrate). In embodiments, the actuator may comprise a first and second actuator element, such as a first and second electrode. A piezoelectric or thermal actuator can for example be made as a single-element actuator, whereas an electrostatic actuator typically comprises at least two actuator elements (e.g., two electrodes). In embodiments, an auxiliary layer may cover at least one of the actuator elements. The auxiliary layer may for example protect the actuator element from contact with the fluid and/or provide isolation (e.g., electrical isolation) between the first and second actuator elements (e.g., to avoid electrical shortage when both actuator elements are brought into contact with one another). In embodiments, the auxiliary layer may be a dielectric layer (e.g., SiN). In some embodiments, the auxiliary layer may be made of different material than the flexible membrane.

In some embodiments, at least one actuator element may be embedded (e.g., enclosed, i.e., fully embedded) in the flexible membrane or in the second substrate. In complementary or alternative embodiments, at least one actuator element may be enclosed by neither the second substrate nor the flexible membrane (i.e., the actuator element may be present outside the second substrate and the flexible membrane). In other embodiments, at least one actuator element may be on (i.e., not embedded in) the flexible membrane or second substrate. In some embodiments, at least the second actuator element—in contact with the second substrate—may not be fully embedded by the second substrate. Not fully embedding the actuator elements (e.g., providing them on the flexible membrane and/or on the second substrate) is typically easier in terms of fabrication. Moreover, it allows to provide the first and second actuator element closer together, thereby, e.g., increasing the actuation force in the case of an electrostatic actuator. Also, a thinner and thus more easily bendable flexible membrane can be formed when the actuator (element) is not enclosed therein. To that end, the material selected for the flexible membrane and/or second substrate may provide for adhesion with the actuator element(s). This can often be a problem when an elastomeric material such as PDMS is selected in combination with commonly used actuator materials (e.g., electrodes), as the actuator element may in that case show a tendency to peel off from the elastomeric material over time. As such, in some embodiments, at least the material of the second substrate in contact with the actuator element may be a rigid material, rather than an elastomeric material.

In embodiments, a distance between a first actuator element and a second actuator element may be 20 µm or less (e.g., 10 µm or less, 5 µm or less, or between 200 nm and 5 µm). Such a distance typically allows to operate the actuator without requiring the actuation force between the actuator elements to become excessive. In some embodiments, a distance between a first actuator element and a second actuator element may taper towards an edge of the second pressure channel portion. For an electrostatic actuator, this may create a "zipping" effect because the attractive force will be larger towards the edge, increasingly pulling in the middle of flexible membrane until it is completely closed. Less actuation force (e.g., a lower voltage) may thereby be required.

In embodiments, a profile of the second pressure channel portion (e.g., perpendicular to the flow direction) may be complementary to a profile of the flexible membrane when the flexible membrane is bent into the second pressure channel portion or out of the cavity. In embodiments, a height of the second pressure channel portion may taper towards an edge thereof. In embodiments, the complementary profile of the second pressure channel portion may be substantially trapezoidal (e.g., isoscelic)—with tapering sides (i.e., not rectangular or square) or hemispherical. A complementary profile may more tightly and thus more completely close off the second pressure channel portion. In embodiments, the second pressure channel portion may be wider than another portion of the pressure channel. In embodiments, the profile of the second pressure channel portion may be complementary to the profile of the flexible membrane both perpendicular and parallel to flow direction. This may further improve the sealing of the second pressure channel portion.

In embodiments, the flexible membrane may comprise a through-hole for coupling a pressure in the cavity with a pressure in the corresponding second pressure channel portion. By balancing the pressure in the cavity and the pressure in the second pressure channel portion, the actuation force used to bend the flexible membrane may be reduced, since it is not counteracted by an over- or underpressure in the cavity.

In embodiments, at least one second pressure channel portion or at least one fluidic channel portion may comprise a valve seat for receiving the flexible membrane upon respectively closing the second pressure channel or fluidic channel portion. In embodiments, the valve seat may be a structure protruding towards the flexible membrane. The valve seat may overcome the height of the second pressure channel portion or fluidic channel portion, thereby allowing the operation of the pressure control switch or pneumatic microvalve with minimal force (e.g., actuation force or pressure) even for a relatively tall second pressure channel portion or fluidic channel portion.

In embodiments, the microfluidic device may comprise—for at least one pressure channel—a first pressure control switch and a second pressure control switch. In embodiments, the first pressure control switch may be located upstream (with respect to a flow direction in the pressure channel) and the second pressure control switch may be located downstream the pressure channel—relative to one of the pneumatic microvalves. The combination of two pressure control switches may allow better control of the pressure at the pneumatic microvalve (e.g., because the pressure flow can be more effectively closed off and/or can be more precisely changed).

In embodiments, the microfluidic device may comprise a peristaltic pump formed by three or more of the pneumatic microvalves which are associated with the same fluidic channel.

In embodiments, the microfluidic device may further comprise an electronic circuit for independently controlling the plurality of pneumatic microvalves (e.g., for operating each actuator independently). As such, the microfluidic device may comprise at least part of a control system for controlling the actuators. In embodiments, the electronic circuit may be coupled or couplable to a controller for controlling the actuators. In some embodiments, the controller may be integrated in the microfluidic device. In other embodiments, the controller may be exterior to the microfluidic device.

In embodiments, any feature of any embodiment of the first aspect may independently be as correspondingly described for any embodiment of any of the other aspects.

In a second aspect, the present disclosure relates to a system comprising the microfluidic device as defined in any embodiment of the first aspect coupled to a pressure source.

The system is typically not particularly limited with respect to the pressure source that is used, as long the latter can deliver a suitable pressure through the pressure line and pressure channels. In embodiments, the pressure source may be coupled to the pressure line using a pressure inlet (cf. supra). In embodiments, the pressure source may be configured for applying a pressure of from 1 kPa to 2 MPa (e.g., from 5 to 500 kPa or from 20 to 200 kPa) at the pneumatic microvalve (i.e., onto the flexible membrane above the fluidic channel portion). The pressure is typically delivered by flowing a gas (e.g., air) or another fluid (e.g., a liquid such as water or a liquid dielectric) through the pressure line and pressure channels. In embodiments, the pressure source may be a compressor or a gas canister.

In embodiments, the system may comprise a controller for controlling the actuators. In embodiments, the controller may be exterior to the microfluidic device and may be coupled (or couplable) thereto (e.g., to an electronic circuit therein therein; cf. supra). In embodiments, a control system for controlling the actuators may comprise the controller and the electronic circuit.

In embodiments, any feature of any embodiment of the second aspect may independently be as correspondingly described for any embodiment of any of the other aspects.

In a third aspect, the present disclosure relates to a use of a microfluidic device according to any embodiment of the first aspect, for independently controlling a plurality of pneumatic microvalves.

In embodiments, any feature of any embodiment of the third aspect may independently be as correspondingly described for any embodiment of any of the other aspects.

Several embodiments will now be described. It is clear that other embodiments can be configured according to the knowledge of the person skilled in the art without departing from the technical teaching of the disclosure, being limited only by the terms of the appended claims.

Example 1

Figure 1:
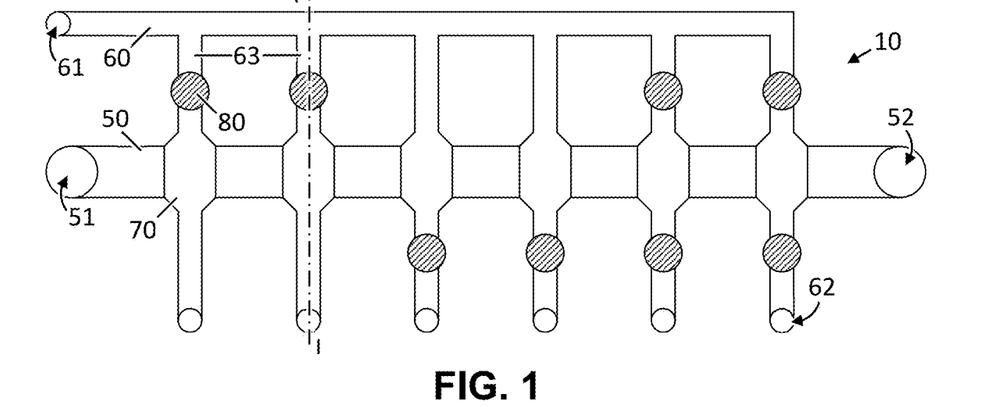
FIG. 1 schematically depicts a top view of a microfluidic device, according to example embodiments.

A top view of an illustrative microfluidic device (10) is schematically depicted in FIG. 1. A pressure line (60) is shown—with one pressure inlet (61), for coupling the pressure line (60) to a pressure source (not depicted)—which branches into six pressure channels (63), each crossing over a fluidic channel (50) and having a pressure outlet (62) (e.g., opening up to the atmosphere). Alternatively (not depicted), the pressure channels may recombine into a single channel with a common outlet. The fluidic channel (50) is fluidically separate from the pressure line (60) and pressure channels (63) and has its own fluidic inlet (51) and fluidic outlet (52). Where the pressure channels (63) and the fluidic channels (50) overlap, six pneumatic microvalves (70) are formed. Further depicted are eight pressure control switches (80), one or more per pressure channel (63). They are located either upstream (as shown for the two leftmost pressure channels (63)), downstream (as shown for the two centre pressure channels (63)) or both up- and downstream (as shown for the two rightmost pressure channels (63)) with respect to the pneumatic microvalves (70). The pressure control switches (80) can be operated independently from one another (e.g., using an electronic circuit that allows sending an electrical signal to each pressure control switch (80) individually). Although the pressure channels (63) are coupled to the same pressure source through the single pressure line (60), (partially) opening or closing a pressure control switch (80) alters the fluid flow in the corresponding pressure channel (63) and thus changes the pressure above the pneumatic microvalve (70). As such, the different pneumatic microvalves (70) can be controlled independently (e.g., individually) based on a single pressure source and pressure line (60).

Figure 2:
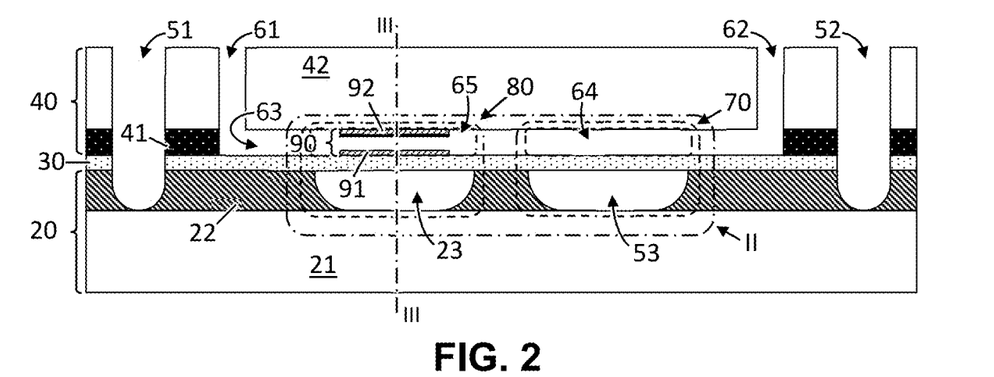
FIG. 2 schematically depicts a vertical cross-section of a microfluidic device, according to example embodiments. The depicted cross-section broadly corresponds to a section taken along the line I-I of FIG. 1, but where the fluidic inlet (51) and outlet (52) and pressure inlet (61) and outlet (62) are depicted in the same plane as the fluidic channel (63).

A vertical cross-section of an illustrative microfluidic device (10) is schematically shown in FIG. 2. Depicted is a first substrate (20)—here built up of a first layer (21) and a second layer (22)—, a flexible membrane (30) covering the first substrate (20) and a second substrate (40) covering the flexible membrane (30)—here also built up of a first layer (41) and a second layer (42). Also shown is a fluidic channel (50) with a fluidic inlet (51) in the second substrate (40), which penetrates though to the first substrate (20), having at least one fluidic channel portion (53) which is defined in the first substrate (20), and then penetrates back up to a fluidic outlet (52) in the second substrate (40). Moreover, a pressure inlet (61) of a pressure line is present in the second substrate (40) and connects to a pressure channel (63) in the second substrate (40), which in turn connects to a pressure outlet (62) in the second substrate (40). A first pressure channel portion (64) overlaps with the fluidic channel portion (53), both being separated by the flexible membrane (30). A pneumatic microvalve (70) is thereby defined, which can be closed or opened by bending the flexible membrane (30) respectively in or out of the fluidic channel portion (53); the bending being controlled by the amount of pressure exercised on the flexible membrane (30) by the fluid in the first pressure channel portion (64) (relative to the fluidic pressure in the fluidic channel portion (53)). This pressure in the first pressure channel portion (64) is controlled by a pressure control switch (80)—here depicted upstream to the pneumatic microvalve (70)—which is formed by a second pressure channel portion (65) overlapping a cavity (23) in the first substrate (20), the flexible membrane (30) again separating both. The pressure control switch (80) further comprises an actuator (90)—here shown as comprising a first actuator element (91) and a second actuator element (92)—which allows to bend the flexible membrane (30) upon activation, thereby opening or closing the pressure control switch (80) and thus controlling the fluid flow through the fluidic channel portion (53).

Figures 3, 4:
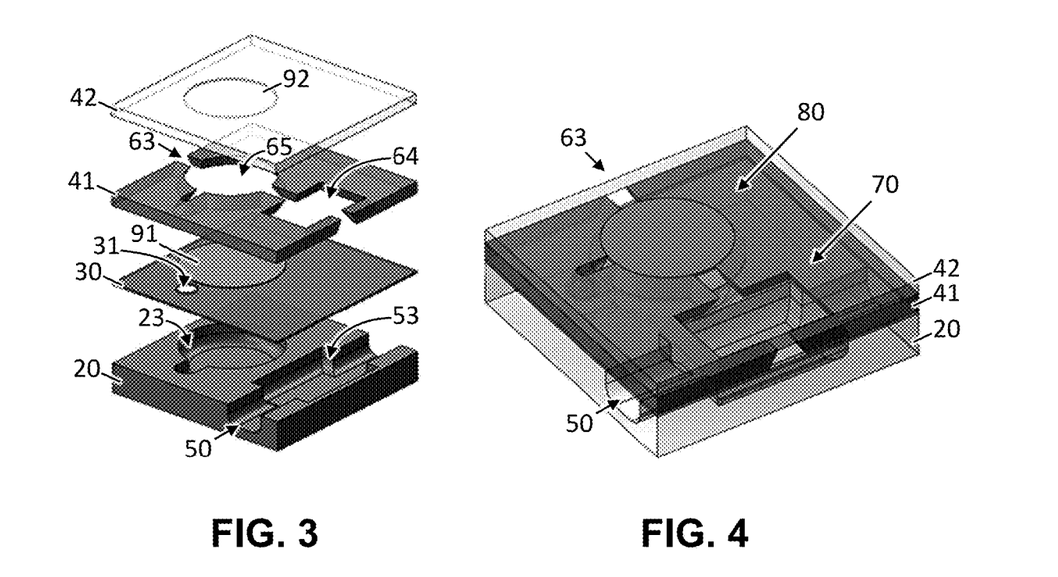
FIG. 3 schematically depicts an exploded view of a portion of a microfluidic device, according to example embodiments. The depicted portion broadly corresponds to portion II of FIG. 2.
FIG. 4 schematically depicts a closed-perspective view of a portion of a microfluidic device, according to example embodiments. The depicted portion broadly corresponds to portion II of FIG. 2.

FIG. 3 and FIG. 4 respectively show an exploded and closed perspective view of an illustrative microfluidic device portion comprising a pressure control switch (80) and a pneumatic microvalve (70). Also visible is an optional through-hole (31) in the flexible membrane (30), through which the cavity (23) is coupled to the second pressure channel portion (65). This allows the cavity (23) to function as a pressure-balancing cavity (23), in which the pressure is in equilibrium with that in the second pressure channel portion (65). As such, when the flexible membrane (30) bends to or away from the cavity (23), the pressure in the second pressure channel portion (65) and the cavity (23) remains balanced, rather than creating an over- or underpressure in the cavity (23). Such an over- or underpressure typically counteracts the actuator (90), so avoiding such pressures decreases the actuation force used.

Example 2

Figure 8:
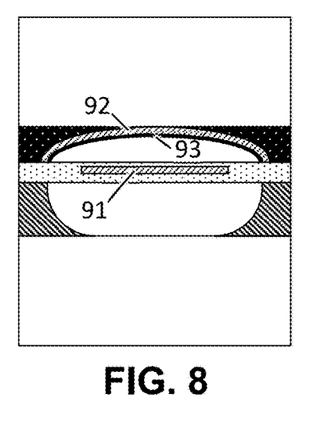
FIG. 8 schematically depicts a pressure control switch architecture, according to example embodiments.
Figure 9:
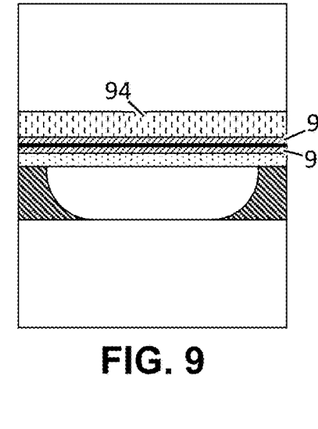
FIG. 9 schematically depicts a pressure control switch architecture, according to example embodiments.
Figure 10:
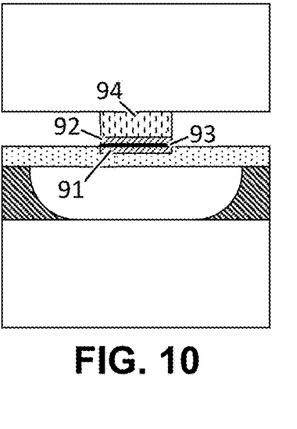
FIG. 10 schematically depicts a pressure control switch architecture, according to example embodiments.

A number of different possible pressure control switch (80) architectures are shown in FIGS. 5 to 11. FIG. 10 depicts the same cross-sectional view as in FIG. 2 (i.e., parallel to the longitudinal direction of the pressure channel). FIGS. 5 to 9 and FIG. 11 depict a cross-sectional view perpendicular to the longitudinal direction (i.e., they show a section taken along the line of FIG. 2).

Figure 5:
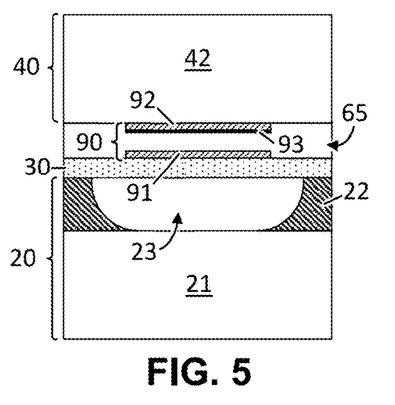
FIG. 5 schematically depicts a pressure control switch architecture, according to example embodiments.

In FIG. 5, the actuator (90) comprises a first actuator element (91) (e.g., a first electrode) on the flexible membrane (30) and a second actuator element (92) (e.g., a second electrode) on the bottom of the second substrate's second layer (42). An optional auxiliary layer (93) (e.g., a dielectric layer) is also depicted covering the second actuator element (92). Such an actuator (90) may for example be based on electrostatic actuation.

Figure 6:
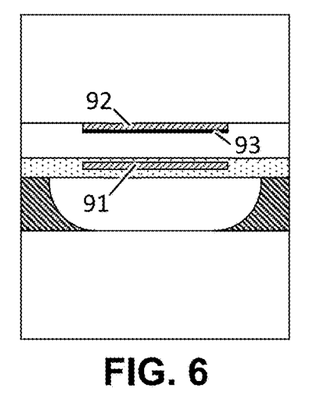
FIG. 6 schematically depicts a pressure control switch architecture, according to example embodiments.

FIG. 6 shows the same arrangement as in FIG. 5, but the first actuator element (91) is enclosed by the flexible membrane (30).

Figure 7:
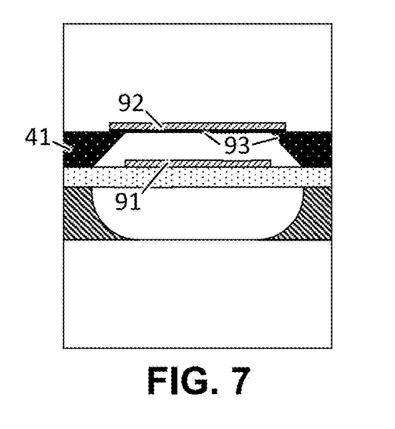
FIG. 7 schematically depicts a pressure control switch architecture, according to example embodiments.

FIG. 7 shows the second actuator element (92) being embedded in the second substrate's second layer (42). The second substrate (40)'s first layer has slanted sidewalls, thereby making the profile of the pressure channel (63) more complementary to the bent flexible membrane (30). The auxiliary layer (93) covers the bottom of the second layer (42) (e.g., the bottom of the second actuator element (92) and the slanted sidewalls of first layer (41).

In FIG. 8, the second substrate's first layer (41) has a hemispherical profile and the first actuator element (91) and auxiliary layer (93) line the bottom of the hemispherical profile. Alongside an improved complementarity, this architecture may reduce the distance between the actuator's first (91) and second (92) actuator elements towards the edge of the pressure channel (63). Because of this smaller distance, the flexible membrane (30)—upon activation—experiences a comparatively larger force near the edge, thus creating a zipping effect in which the flexible membrane (30) closes first at the edges and continues towards the middle. A smaller overall actuation force is thereby used to bend the flexible membrane (30).

FIG. 9 and FIG. 10 show an architecture in which as valve seat (94) is used under which the actuator (90)'s second actuator element (92) is provided. In absence of an actuation force, the pressure in the second pressure channel portion (65) bends the flexible membrane (30) into the cavity (23), so that the pressure control switch (80) is in the open state. Conversely, upon actuation the flexible membrane (30) is pulled against the valve seat (94), thereby closing the pressure control switch (80). Because the valve seat (94) bridges the channel height, it may make the actuator (90) independent of the channel height, thus allowing even a relative tall second pressure channel portion (65) to be controlled using a relatively small actuation force.

Figure 11:
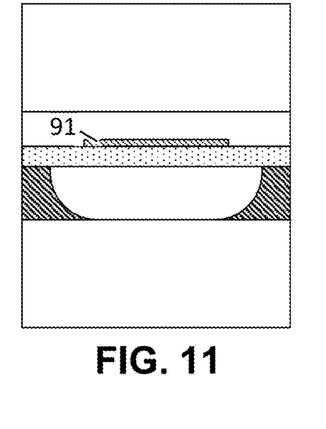
FIG. 11 schematically depicts a pressure control switch architecture, according to example embodiments.

In the architecture depicted in FIG. 11, only a single actuator (90) actuator element is used. Such an actuator (90) may for example be based on piezoelectric actuation.

It is to be understood that although examples embodiments, specific constructions and configurations, as well as materials, have been discussed herein for devices according to the present disclosure, various changes or modifications in form and detail may be made without departing from the scope and technical teachings of this disclosure. For example, any formulas given above are merely representative of procedures that may be used. Functionality may be added or deleted from the block diagrams and operations may be interchanged among functional blocks. Steps may be added or deleted to methods described within the scope of the present disclosure.

What is claimed is:

1. A microfluidic device for independently controlling a plurality of pneumatic microvalves, the microfluidic device being couplable to a pressure source and comprising:
   a first substrate;
   a flexible membrane covering the first substrate;
   a second substrate covering the flexible membrane;
   one or more fluidic channels at least partially defined in the first substrate;
   a pressure line couplable to the pressure source and branching into a plurality of pressure channels, the pressure channels being at least partially defined in the second substrate,
   wherein each of the plurality of pneumatic microvalves comprises:
      a portion of one of the fluidic channels; and
      a first portion of the pressure channel overlapping the fluidic channel portion, wherein the first portion of the pressure channel and the fluidic channel portion are separated by the flexible membrane such that a pressure in the first portion of the pressure channel is configured to bend the flexible membrane:
         into the fluidic channel portion or out of the first portion of the pressure channel, thereby closing the fluidic channel portion; or
         out of the fluidic channel portion or into the first portion of the pressure channel, thereby opening the fluidic channel portion; and
   at least one pressure control switch per pressure channel, wherein each pressure control switch comprises:
      a cavity in the first substrate;
      a second portion of the corresponding pressure channel overlapping the cavity, wherein the second portion of the pressure channel and the cavity are separated by the flexible membrane; and
      an actuator for bending the flexible membrane:
         into the second portion of the pressure channel or out of the cavity, thereby closing the second portion of the pressure channel; or
         out of the second portion of the pressure channel or into of the cavity, thereby opening the second portion of the pressure channel, and
   wherein each actuator is independently operable.

2. The microfluidic device according to claim 1, wherein the first substrate or the second substrate comprises a rigid material.

3. The microfluidic device according to claim 2, wherein the rigid material comprises a glass or semiconductor material.

4. The microfluidic device according to claim 1, wherein at least one actuator comprises an electrostatic actuator, a piezoelectric actuator, or a thermal actuator.

5. The microfluidic device according to claim 1, wherein, for at least one actuator, at least an element of the actuator is enclosed by neither the second substrate nor the flexible membrane.

6. The microfluidic device according to claim 1, wherein, for at least one of the second portions of the pressure channels, a profile of the second portion of the pressure channel is complementary to a profile of the flexible membrane when the flexible membrane is bent into the second portion of the pressure channel or out of the cavity.

7. The microfluidic device according to claim 1, wherein, for at least one of the second portions of the pressure channels, a distance between a first actuator element and a second actuator element tapers towards an edge of the second portion of the pressure channel.

8. The microfluidic device according to claim 1, wherein at least one of the second portions of the pressure channels or at least one fluidic channel portion comprises a valve seat for receiving the flexible membrane upon closing the second portion of the pressure channel.

9. The microfluidic device according to claim 8, wherein the valve seat comprises a structure protruding towards the flexible membrane.

10. The microfluidic device according to claim 1, further comprising a peristaltic pump formed by three or more of the pneumatic microvalves that are associated with the same fluidic channel.

11. The microfluidic device according to claim 1, wherein, for at least one fluidic channel portion, a profile of the fluidic channel portion is complementary to a profile of the flexible membrane when the flexible membrane is bent into the fluidic channel portion.

12. The microfluidic device according to claim 1, further comprising, for at least one pressure channel, a first pressure control switch and a second pressure control switch, wherein the first pressure control switch is located upstream and the second pressure control switch is located downstream of the pressure channel relative to one of the pneumatic microvalves.

13. The microfluidic device according to claim 1, wherein, for at least one of the pressure control switches, the flexible membrane comprises a through-hole for coupling a pressure in the cavity with a pressure in the corresponding second portion of the pressure channel.

14. A system comprising:
  a pressure source;
  a microfluidic device for independently controlling a plurality of pneumatic microvalves, wherein the microfluidic device is coupled to the pressure source and comprises:
    a first substrate;
    a flexible membrane covering the first substrate;
    a second substrate covering the flexible membrane;
    one or more fluidic channels at least partially defined in the first substrate;
    a pressure line couplable to the pressure source and branching into a plurality of pressure channels, the pressure channels being at least partially defined in the second substrate,
    wherein each of the plurality of pneumatic microvalves comprises:
      a portion of one of the fluidic channels; and
      a first portion of the pressure channel overlapping the fluidic channel portion, wherein the first portion of the pressure channel and the fluidic channel portion are separated by the flexible membrane such that a pressure in the first portion of the pressure channel is configured to bend the flexible membrane:
        into the fluidic channel portion or out of the first portion of the pressure channel, thereby closing the fluidic channel portion; or
        out of the fluidic channel portion or into the first portion of the pressure channel, thereby opening the fluidic channel portion; and
    at least one pressure control switch per pressure channel, wherein each pressure control switch comprises:
      a cavity in the first substrate;
      a second portion of the corresponding pressure channel overlapping the cavity, wherein the second portion of the pressure channel and the cavity are separated by the flexible membrane; and
      an actuator for bending the flexible membrane:
        into the second portion of the pressure channel or out of the cavity, thereby closing the second portion of the pressure channel; or
        out of the second portion of the pressure channel or into of the cavity, thereby opening the second portion of the pressure channel, and
    wherein each actuator is independently operable.

15. The system of claim 14, wherein the first substrate or the second substrate comprises a rigid material.

16. The system of claim 15, wherein the rigid material comprises a glass or semiconductor material.

17. The system of claim 14, wherein at least one actuator comprises an electrostatic actuator, a piezoelectric actuator, or a thermal actuator.

18. The system of claim 14, wherein, for at least one actuator, at least an element of the actuator is enclosed by neither the second substrate nor the flexible membrane.

19. The system of claim 14, wherein, for at least one of the second portions of the pressure channels, a profile of the second portion of the pressure channel is complementary to a profile of the flexible membrane when the flexible membrane is bent into the second portion of the pressure channel or out of the cavity.

* * * * *